United States Patent [19]
Jolissaint

[11] Patent Number: 5,181,239
[45] Date of Patent: Jan. 19, 1993

[54] CALL TAGGING USER INFORMATION IN A TELEPHONIC ENVIRONMENT

[75] Inventor: Charles H. Jolissaint, Sunnyvale, Calif.

[73] Assignee: ROLM Systems, Santa Clara, Calif.

[21] Appl. No.: 861,172

[22] Filed: Mar. 27, 1992

Related U.S. Application Data

[63] Continuation of Ser. No. 565,076, Aug. 9, 1990, abandoned.

[51] Int. Cl.$^5$ .............................................. H04M 3/58
[52] U.S. Cl. .................................... 379/96; 379/212; 379/265; 379/266
[58] Field of Search ............. 379/93, 94, 96, 210–212, 379/201, 265, 266, 142

[56] References Cited

U.S. PATENT DOCUMENTS

| | | |
|---|---|---|
| 4,400,587 | 8/1983 | Taylor et al. ...................... 379/266 |
| 4,737,983 | 4/1988 | Frauenthal et al. ................ 379/265 |
| 4,805,209 | 2/1989 | Baker, Jr. et al. ................... 379/96 |
| 4,943,996 | 7/1990 | Baker, Jr. et al. ................... 379/96 |
| 4,951,310 | 8/1990 | Honda et al. ....................... 379/266 |

Primary Examiner—James L. Dwyer
Assistant Examiner—Ahmad F. Matar
Attorney, Agent, or Firm—Michael B. Einschlag

[57] ABSTRACT

Method and apparatus for permitting host applications processors to read information from and/or to write information into a database which is stored at a switching machine which interfaces with the host applications processors. The information relates to a caller and the database record for the caller is maintained as long as the caller has an ongoing telephone call at the switch.

14 Claims, 5 Drawing Sheets

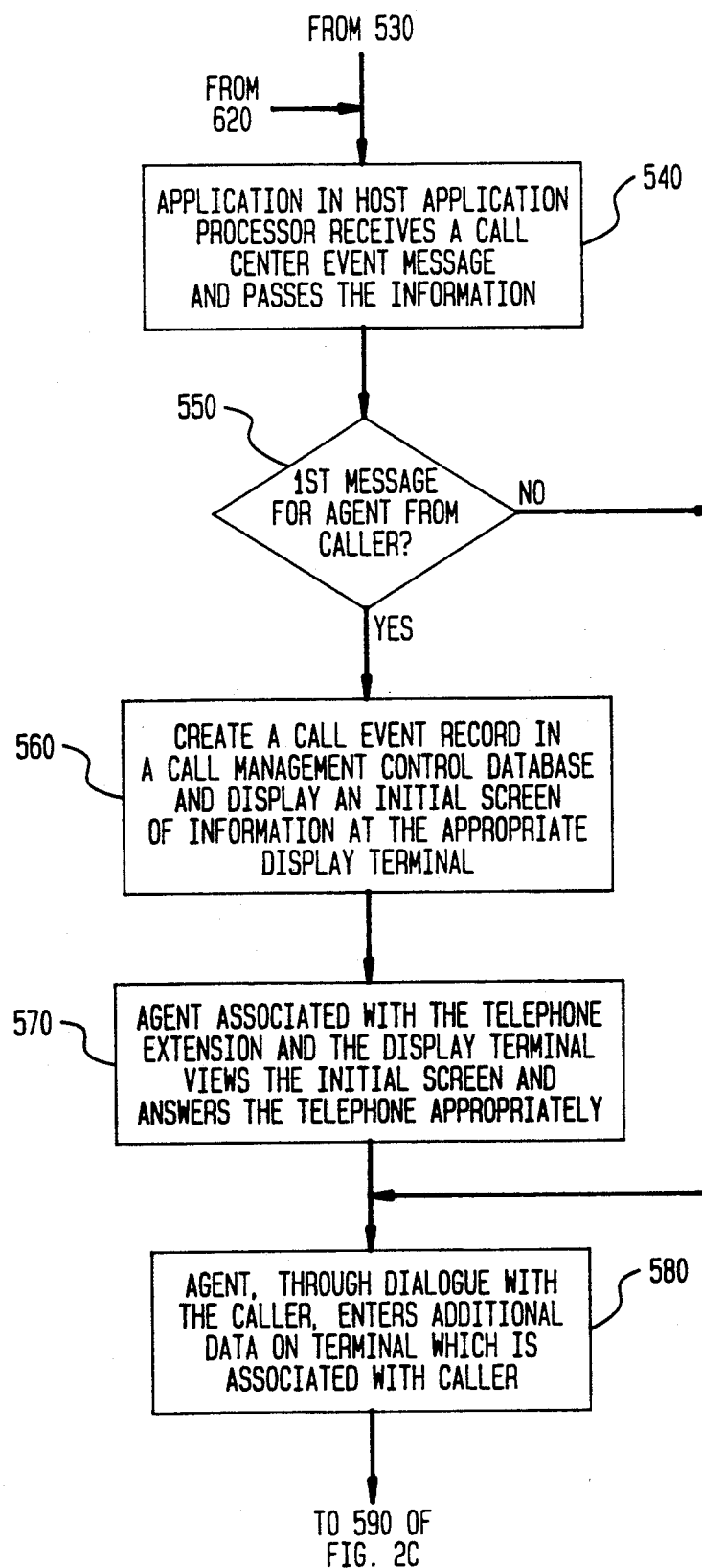

CALL TAGGING USER INFORMATION IN A TELEPHONIC ENVIRONMENT

CROSS-REFERENCE TO RELATED APPLICATION

This is a continuation of Ser. No. 07/565,076 filed Aug. 9, 1990 now abandoned.

TECHNICAL FIELD OF THE INVENTION

The present invention pertains to method and apparatus for tagging user information in a telephonic environment for use by a multiplicity of applications processor systems.

BACKGROUND OF THE INVENTION

U.S. Pat. No. 4,805,209 entitled "Coordinated Transfer of Voice and Information Through a Digital Switch" discloses method and apparatus for coordinating the transfer of a telephone call and information associated with the telephone call in a call center environment wherein: (a) a digital switch such as, for example, a ROLM Systems CBX which is manufactured by ROLM Systems of Santa Clara, Ca. manages a plurality of telephones; (b) a host applications processor such as, for example, an IBM 370 manages a plurality of display terminals; and (c) telephone calls are transferred among display terminals and telephones associated with the telephone calls. The patent discloses method and apparatus wherein a telephone call input to the CBX is transferred among agents which are stationed at various display terminals. The CBX transfers the telephone call among the telephones and the CBX transfers information pertaining to the telephone call to the host applications processor, which information is used by the host applications processor to display relevant information concerning the call to the appropriate agent. As a result, in this environment, the host applications processor can move information pertaining to a caller from one agent's screen to another agent's screen to coordinate with the voice portion of the call being transferred from the one agent's telephone to the another agent's telephone.

While the above-described method and apparatus suffices in a call center environment wherein a multiplicity of agents are served by a single host applications processor, it does not provide proper operation in a call center environment wherein a switch, such as the CBX switch referred to above, may interact simultaneously with a multiplicity of different host applications processors for performing a multiplicity of different call center functions for various groups of agents. It is important to note that such an environment will exist even in a single business enterprise. This occurs because, typically, even a single business enterprise provides its customers with a multiplicity of different call center services. In such a call center environment, as calls transfer among agents in a business enterprise, a call may involve agents whose terminals interact with host applications processors from different departments. Further, in most cases, these host applications processors cannot communicate with one another and, in fact, these host applications processors have limited knowledge of one another. Still further, in some cases, agents may utilize terminals which are connected to personal computer desktop applications systems such as personal computer desktop systems which are implemented on an IBM PS/2 personal computer.

As a result of the above, there is a need for method and apparatus for permitting host applications processor control links to the switch, such as, for example, the CBX, that permit independent hosts applications processors to tag a call with information which is transferred with the call to identify the caller with application specific information such as, for example, caller account number or an address by which one host applications processor might access further information relating to the caller from another host applications processor.

SUMMARY OF THE INVENTION

Embodiments of the present invention advantageously satisfy the above-identified need in the art and provide method and apparatus for permitting host applications processors to read information from and/or to write information into a database which is stored at a switching machine which interfaces with the host applications processors. The information relates to a caller and the database record for the caller is maintained as long as the caller has an ongoing telephone call at the switch. In a preferred embodiment of the present invention, a host applications processor accesses information in the database by using an access key comprised of: (a) a call identifier which is transmitted by the switch to the host applications processor or (b) another identifier such as, for example, the extension number of the caller. Advantageously, the database provides information such as, for example, caller history and identification throughout the duration of the call as the call is transferred from one agent to another agent or during times when the caller is awaiting service and is parked in a queue. Lastly, in further embodiments of the present invention, predetermined portions of the caller information can be visually displayed on display telephones attached to the switch for viewing by an agent.

Embodiments of the present invention advantageously enhance the ability of host applications processors to transfer data among themselves without the need for the host applications processors to have detailed knowledge of each other's internal workings. In accordance with the present invention, this is done by tagging a call with information which is stored in a centralized database, which information is available for retrieval and update by the various host applications processors. In particular, various independent host applications processors can tag a call so that the information can be accessed by application specific information such as, for example, caller account number or an internal address. In order to implement embodiments of the present invention most efficiently, one can impose enterprise standardized information format and content for the information stored in the caller database at the switch, for example, the CBX. In one embodiment of the present invention, the information in a record in the caller database begins with the caller's billing telephone number denoted, for example, by the Automatic Number Identification (ANI) supplied by the network. Further information such as, for example, caller account information is added by various host applications processors as more information about the caller is obtained through, for example, agent interactions. This information is stored for the duration of the call at the switch in the caller database.

In general, an embodiment of the present invention is a method for coordinating the transfer of a telephone call and information associated with the telephone call in a telephony environment comprised of (a) at least one telephone which interfaces with a switch and (b) at least one display apparatus which interfaces with an applications processor system, wherein at least one of the at least one telephone is associated with a called party who also uses at least one of the at least one display apparatus, the method comprising the steps of: (a) adding a record to a database associated with the switch in response to a telephone call from a calling party to one of the called parties, which record comprises information pertaining to the calling party; (b) transmitting at least some of the information to an applications processor system which interfaces with a display apparatus used by the called party; (c) retrieving at least some portion of the information from the record in response to a request to transfer the calling party to another called party; and (d) transferring the retrieved information to an applications processor system which interfaces with a display apparatus used by the another called party.

BRIEF DESCRIPTION OF THE DRAWING

A complete understanding of the present invention may be gained by considering the following detailed description in conjunction with the accompanying drawing, in which:

FIGS. 2A-2D are a flowchart of a preferred embodiment of the present invention.

DETAILED DESCRIPTION

Figure 1:
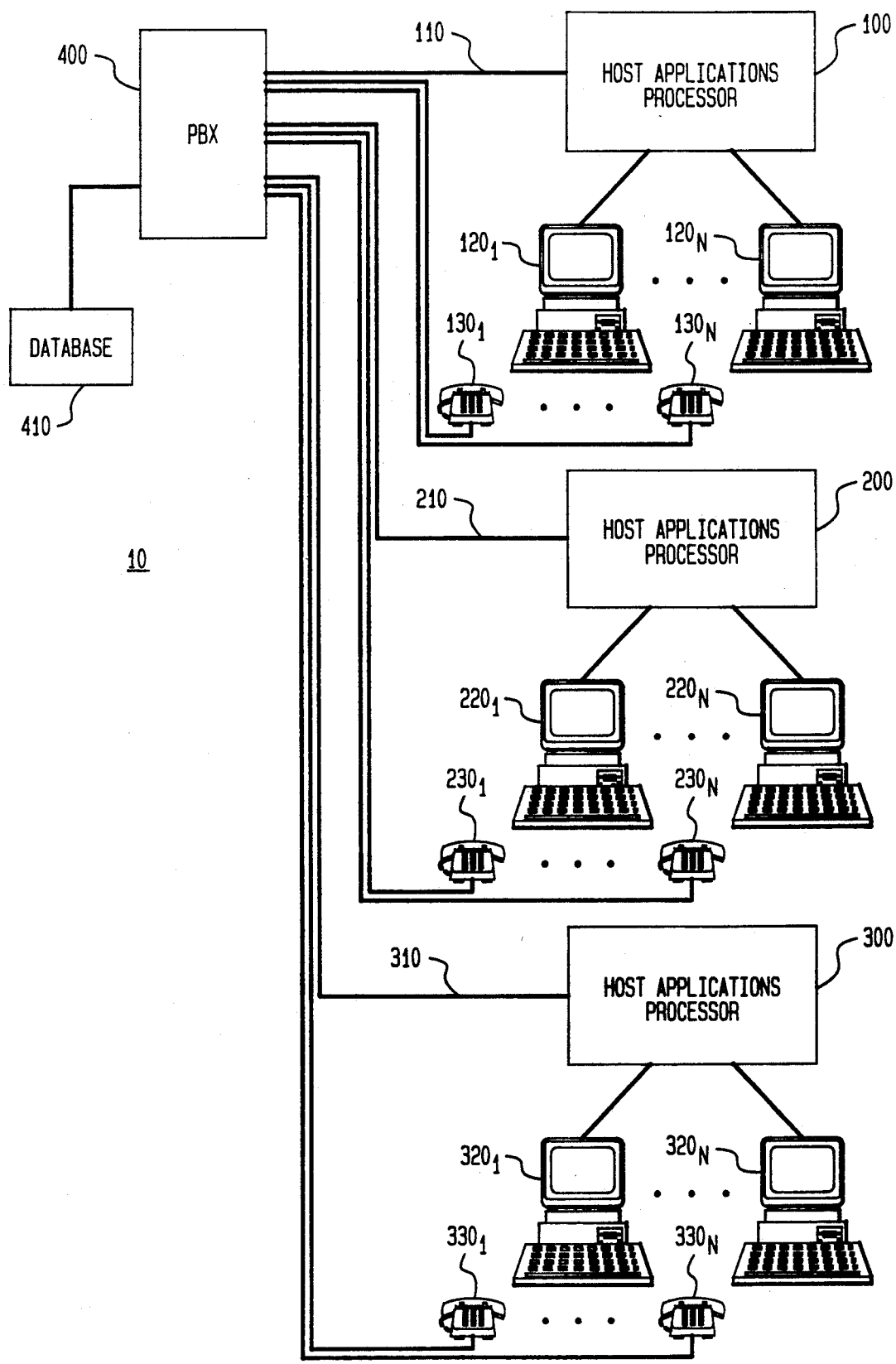
FIG. 1 is a block diagram of an embodiment of the present invention.

FIG. 1 is a block diagram of a telephony system and, in particular, a Call Center System (CCS) 10 that includes an embodiment of the present invention. CCS 10 comprises host applications processors 100, 200, and 300. Host applications processor 100 is coupled by means of logical unit interface 110, for example, an LU 6.2 interface, to local branch exchange, for example, private branch exchange (PBX) 400. LU 6.2 interface 110 is a standard System Data Link Control (SDLC) communication link that corresponds to the LU 6.2 standard. A detailed description of an LU 6.2 communication link and a description of how to implement a program interface to conform with this standard is provided in the following documents published by the International Business Machines Corporation: "Systems Network Architecture: Sessions Between Logical Units, GC20-1868" and "SNA Transaction Programmer's Reference Manual For LU 6.2, GC30-3084". In other embodiments of the invention the link between host applications processor 100 and PBX 400 may be other than a communication link that conforms to the LU 6.2 standard. For example, while host applications processor 200 is coupled to PBX 400 by means of LU 6.2 interface 210, host applications processor 300 is coupled to PBX 400 by means of ACL interface 310. Further, as is well known to those of ordinary skill in the art, such an ACL interface link can either be networked or it can be a dedicated link. In further embodiments, host applications processors 100, 200, and 300 may interface with PBX 400 by means of a telephone such as, for example, a ROLMPhone 244PC which is manufactured by ROLM Systems, which telephone, in turn, transfers commands and data back and forth between PBX 400 and the host applications processor. Lastly, using an ISDN D channel connectivity capability which is well known to those of ordinary skill in the art, user defined commands and data may be sent back and forth between PBX 400 and a host applications processor, which information may be embedded in ISDN user-to-user messages.

Host applications processors 100, 200, and 300 include memory (not shown) that is comprised of both random access memory such as temporary RAM and mass storage memory devices such as, for example, magnetic disks and/or magnetic tape units. Apparatus that embodies these functional blocks is described in detail in U.S. Pat. No. 4,805,209, issued Feb. 14, 1989. Although the ensuing description is made in reference to a hardware and software system as described in U.S. Pat. No. 4,805,209, it should be appreciated that the teaching of the present invention is not limited for use with only such a system and that, instead, the teaching of the present invention is applicable to a large number of possible hardware and/or software embodiments.

Host applications processor 100 may be a version of an IBM System/370 processor, a description of which is found in a document entitled "S/370 Reference Summary, GX20-1850", published by the International Business Machines Corporation; and host applications processors 200 and 300 may be a similar type of processor or they may be minicomputers available from IBM, Digital Equipment Corporation, Hewlett-Packard Corporation, and so forth, or they may be microprocessor desktop computers such as those manufactured by IBM, and so forth. In addition, while host applications processor 100 is described as an S/370 processor, it should be clear to those of ordinary skill in the art that the invention can be practiced with other mainframe processors or with minicomputers or microprocessors. Further, PBX 400 may be embodied as one of a number of PBX's which are well known to those of ordinary skill in the art such as, for example, a ROLM 8000 or a ROLM CBX II 9000, a description of which is found in a document entitled "ROLM CBX II 9000 Business Communications System", published in 1986 by the ROLM Corporation. However, it should be clear to those of ordinary skill in the art that the invention can be practiced with other varieties of PBX or CBX equipment.

As shown in FIG. 1, a plurality of user terminals $120_1$ to $120_n$ are coupled to host applications processor 100; a plurality of user terminals $220_1$ to $220_n$ are coupled to host applications processor 200; and a plurality of user terminals $320_1$ to $320_n$ are coupled to host applications processor 300. In addition, a plurality of phones $130_1$ to $130_n$ are coupled to PBX 400 for use by agents at user terminals $120_1$ to $120_n$, respectively; a plurality of phones $230_1$ to $230_n$ are coupled to PBX 400 for use by agents at user terminals $220_1$ to $220_n$, respectively; and a plurality of phones $330_1$ to $330_n$ are coupled to PBX 400 for use by agents at user terminals $320_1$ to $320_n$, respectively.

Lastly, database 410 is coupled to PBX 400 for use in a manner which will be described in detail below. Specifically, in a preferred embodiment of the present invention, database 410 is stored at or in connection with PBX 400 and is comprised of information which is related to a call from a caller in a data record. In particular, a data record is created at the inception of a call, the initial data in the record may comprise information such as the caller's automatic number identification (ANI)

and caller account code and any other information which is configured by a business enterprise which is the recipient of calls from a particular caller. The actual content of a database record in any particular embodiment of the present invention may be defined by the particular business enterprise which utilizes the embodiment. For example, in some environments, PBX 400 may receive a caller's ANI and may use that to extract specific information from an associated permanent database of caller information.

Advantageously, for a particular business enterprise, a record in database 410 will include data fields that are meaningful to PBX 400 such as, for example, an ANI data field, a display field which is comprised of information which is useful for display, for example, on an agent's display telephone such as telephones $130_1$ to $120_n$ when the display field has been specified, in advance, by a particular call center application to be sent to a predetermined telephone when the caller is routed thereto. For example, in an environment wherein telephones $130_1$ to $130_n$ are display telephones such as, for example, ROLMPhone display telephones manufactured by ROLM Systems, the various display fields in the data record for a call would comprise 24 characters.

In accordance with the present invention, information which is associated with a call is written into or read from a database call record in database 410 by any of the authorized ones of host applications processors 100, 200, and 300 which interface with PBX 400. In a preferred embodiment of the present invention, a typical command to write data into a caller database record comprises a relational data descriptive format such as, for example:

```
WRITE   [Call ID/PORT, ID/EXTENSION, ID;
         DATA TYPE 1, DATA LENGTH 1,
         DATA CONTENT 1; DATA TYPE 2,
         DATA LENGTH 2, DATA CONTENT 2; and
         so forth]
```

In this format, ID/PORT, ID/EXTENSION, and ID are various identifiers which PBX 400 supplies to a particular host applications processor when PBX 400 initially transfers data concerning the call to the host applications processor. DATA TYPE 1, DATA LENGTH 1, and DATA CONTENT 1 are an identifier for a data field, the length of the data field, and the data field, respectively, which are supplied by a host applications processor, in a predetermined format, for use by PBX 400 in adding information to a caller record in caller database 410 at PBX 400. Further, in the preferred embodiment, a read data command comprises:

```
READ    [Call ID/PORT, ID/EXTENSION, ID;
         DATA TYPE 1, DATA LENGTH 1,
         DATA CONTENT 1; DATA TYPE 2,
         DATA LENGTH 2, DATA CONTENT 2; and
         so forth]
```

In addition, a READ command also has an option which causes all information relating to a particular call to be transferred to the host applications processor.

The manner in which a database record is created, read, updated, and closed in database 410 are well known to those of ordinary skill in the art.

The following describes, in general, a typical call senario which illustrates the manner in which embodiments of the inventive method and apparatus operate.

In particular, assume that a caller places a telephone call to a particular call center which is serviced by PBX 400 and host applications processor 200. As one can readily appreciate, the call can come from a distant caller whose telephone is not interfaced directly with PBX 400 or it can come from an extension which is interfaced directly to PBX 400.

PBX 400 is comprised of a call center (CC) application program that resides, for example, in PBX 400 application memory. As described above, the call is input to PBX 400 either over a trunk port (not shown) or through an extension which accesses PBX 400. In response to the call, PBX 400 checks a call center data base in database 410 to determine whether the called party relates to a telephone which is associated with a call center (CC), i.e., is a CC flagged extension. Embodiments of the present invention, include environments wherein call center called parties can be automatic call distributor (ACD) group pilots, normal extensions, ATCs, and trunks. The CC application in PBX 400 is responsible for processing information from each flagged extension and managing the communication links between PBX 400 and the host applications processors 100, 200, and 300. If the call is a CC flagged extension, the call center database contains information such as, for example: (a) a communications interface address for the associated host applications processor — in this case for host applications processor 200; (b) whether the called telephone is a display telephone and, if so, indicators which determine whether or not certain information is to be sent to the telephone by PBX 400 for display at the display telephone; (c) the priority of service for the called party; and (d) the class of service for the called party. In addition, PBX 400 creates an initial data record in caller database 410 in a manner which is well known to those of ordinary skill in the art and causes ANI and DNIS (dial number information system) information which is provided to PBX 400 by the network in a manner which is well known to those of ordinary skill in the art to be stored in the record in a manner which is well known to those of ordinary skill in the art. The record may also contain the trunk number of the calling party and the extension number of the called party. PBX 400 then transmits a message to host applications processor 200 over host interface link 210. The message contains information from the data record which is predetermined in accordance with business enterprise standards. Then, PBX 400 routes the telephone call in accordance with its standard algorithms to the called agent's telephone, for example, telephone $230_1$, and may send predetermined information for display at telephone $230_1$. Note that after PBX 400 encounters a CC flagged extension, subsequent call events associated with the caller continue to generate CC event transaction messages which are sent to appropriate ones of host applications processors 100, 200, or 300.

Within host applications processor 200, a call center agent (CCA) application program processes messages received from PBX 400 and coordinates the transfer of information to terminals $220_1$ to $220_n$ associated with particular host applications processor 200 — in one embodiment of the present invention, the CC application in PBX 400 and the CCA application in host applications processors 100, 200, and 300 are all CICS application programs wherein the interface between the CC application in PBX 400 and the CCA applications in host applications processor 100, 200, and 300 may be provided in accordance with methods which are well known to those of ordinary skill in the art. In particular, in response to the initial call event message from PBX 400, the CCA application in host applications processor 200 transmits caller information, for example, ANI and/or DNIS information, to display terminal $220_1$ for display to the agent who answers telephone $230_1$.

Subsequently, during a dialog between the agent and the caller, the agent obtains additional information relating to the caller and this additional information is transmitted to host applications processor 200 via the agent's display terminal $230_1$. The CCA application in host applications processor 200 causes some of the new information, for example, the customer's account code, to be written, into caller database 410 at PBX 400 by transferring this additional information to PBX 400 over link 210 using a WRITE DATA command. PBX 400 receives the write command and, in a manner which is well known to those of ordinary skill in the art, updates the record for the caller in caller database 410. In addition, PBX 400 sends a message to the host applications processor each time the status of the caller changes such as, for example, whenever a call follows busy, DND (do not disturb) or station forwarding or when a caller places a call center extension on hold.

Subsequently, the agent, for example, a car insurance agent, transfers the call to another agent, for example, a home insurance agent. The second agent's display terminal, for example, display terminal $330_1$, interfaces with host applications processor 300.

Whenever an agent transfers a caller to another extension, PBX 400 sends a message to the next host applications processor which interfaces with the display terminal that is used by the agent at the new called extension, i.e., PBX 400 sends a message to host applications processor 300 over link 310 to identify the caller being transferred to the second agent. The new message contains information which is predetermined in accordance with the business enterprise standards such as predetermined information from caller database 410 and the called extension. Depending upon the configuration of PBX 400 for receiving the new agent's extension, the caller account number is automatically sent to host applications processor 300 for the second agent upon ringing or, in further embodiments, host applications processor 300 for the second agent interrogates PBX 400 to obtain caller unique data for the caller connected to the second agent and receives the account code associated with the call, which data had been written to caller database 400 by host applications processor 300. In an embodiment wherein the transfer is screened, i.e., the transferror agent stays on and notifies the agent at the called extension, the predetermined information may include the extension of the transferror agent. If the transfer is not completed and the transferror agent retains the call, PBX 400 notifies both host applications processors, the one for the first agent and the one for the second agent, that the call was not completed.

Whenever a caller is queued for an ACD group id/pilot number which is configured for call center operation, PBX 400 sends a connection message for the queue to the appropriate host applications processor. The message contains information which is predetermined in accordance with the business enterprise standards such as predetermined information from caller database 410 and the ACD group id/pilot number.

In accordance with the present invention, host applications processor 300 brings up screens at display terminal $320_1$ that are associated with the caller using the caller's account code in the context of its particular application, for example, home insurance. Thus, as the caller is transferred to other call center agents, the display terminal of each successive call center called agent may be updated with information that was available to previous agents.

Whenever a CC call is terminated with respect to a particular host applications processor, PBX 400 sends a termination message thereto which identifies the caller. Finally, whenever the caller ends the call, PBX 400 deletes the caller record in database 410 in a manner which is well known to those of ordinary skill in the art. Of course, those of ordinary skill in the art will recognize that in further embodiments of the present invention, caller records for terminated calls may be saved for analysis, for example, for off-line analysis by applications programs to obtain statistics relevant to determining efficiency of call center performance and the like.

The following is a functional description of one embodiment of the senario described above. The business enterprise creates a database at database 410 which identifies called parties which are associated with a call center. The database is created in a manner which is well known to those of ordinary skill in the art and associates the called party extension with a particular host applications processor and the communications link therebetween. Further, the database may contain further format information which is used by PBX 400 in communicating with the called extension in order, for example to provide display. At the initiation of a call to any call center extension, PBX 400 creates a database record in caller database 410, which database record remains active until the caller hangs up.

Figure 2A:
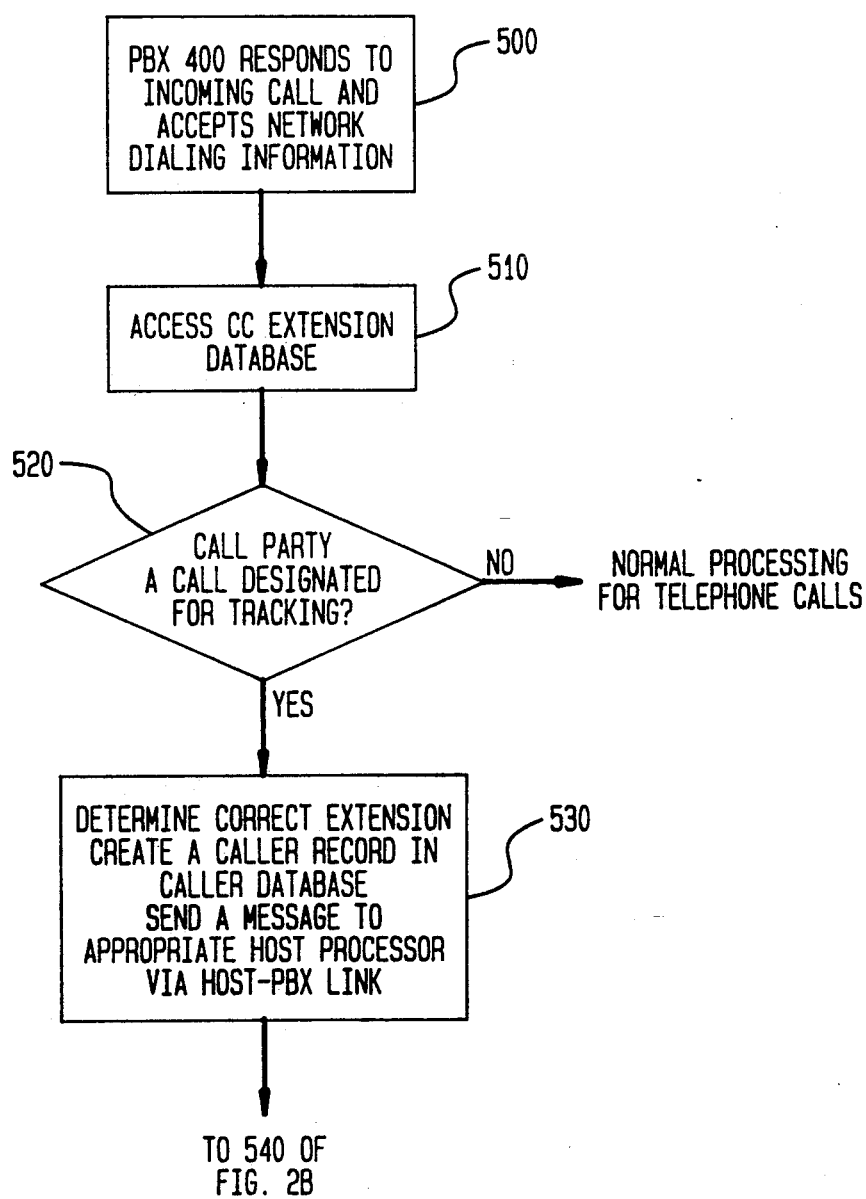

FIG. 2 is a flowchart which illustrates coordinated voice and data display provided by an embodiment of the present invention. The processing begins at block 500 in FIG. 2A wherein PBX 400 responds to an incoming call and accepts network dialing information that accompanies the call. Block 500 refers to normal PBX call processing which is well known to those of ordinary skill in the art. Control is then transferred to block 510 of FIG. 2A.

At block 510 of FIG. 2A, an applications program at PBX 400 accesses the CC extension database in database 410 and transfers control to decision block 520 of FIG. 2A.

At decision block 520 of FIG. 2A, the applications program in PBX 400 determines whether this is a call designated for tracking. If so, control is transferred to block 530 of FIG. 2A, otherwise, PBX 400 transfers to normal call processing.

At block 530 of FIG. 2A, the applications program in PBX 400: (a) determines the correct extension to which the call is to be routed; (b) generates a caller record in database 410; and (c) sends a call center event message to the appropriate host applications processor via a host-PBX link. Then, control is transferred to block 540 of FIG. 2B.

At block 540 of FIG. 2B, a call center application in the host applications processor (HCCA) receives the call center event message and parses the information. Then, control is passed to decision block 550 of FIG. 2B. At decision block 550 of FIG. 2B, the HCCA program determines whether this is the first event for the agent at the called extension for the caller. If it is the first event, then control is transferred to block 560 of FIG. 2B, otherwise, control is transferred to block 580 of FIG. 2B.

At block 560 of FIG. 2B, the HCCA program creates a call event record in a call center control database, the database being embodied, for example, in a table referred to as the CCCT. In accordance with the preferred embodiment of the present invention, the call event record in the CCCT is updated to reflect each event that affects the extension. Then, the HCCA program uses the telephone extension sent from PBX 400 or some other identifier such as, for example, ANI to access an extension-to-display terminal database to determine the display terminal to which screen displays are sent. For example, in one embodiment of the present invention, the extension-to-display terminal database is searched using a sixteen byte extension of the called party to obtain a logical unit address of the display terminal which is associated with the telephone call. When a match is found between the sixteen byte extension and the first sixteen bytes of a record, the HCCA program knows the display terminal to which screen information is to be sent. Finally, the HCCA program determines the proper screen display and transmits it to the display terminal. Then, control is transferred to box 570 of FIG. 2B.

At block 570 of FIG. 2B, the agent at the display terminal views the information on the screen and answers the telephone call appropriately. As a result, the display terminal associated with the agent shows customer data for the caller as the telephone is ringing. Optionally, the screen at the display terminal is updated as soon as the telephone call is answered. As one can readily appreciate, advantageously, the agent is now fully prepared to deal with the customer without having to ask the customer for information that has already been conveyed to a previous agent. Then, control is transferred to block 580 of FIG. 2B.

At block 580 of FIG. 2B, the agent, through dialogue with the caller, receives information and enters it into the display terminal keyboard. The HCCA program receives the information and further interacts with the agent via the display terminal. For example, the HCCA program may use the information to access a local database associated with the particular application. In addition, the HCCA program can send a message to the application program in PBX 400 to obtain data in the caller's record in caller database 410, by use of the READ command discussed above, and the HCCA program can send a message to the application program in PBX 400 to insert data into the caller's record in caller database 410, by use of the WRITE command discussed above. Then, control is transferred to decision block 590 of FIG. 2C.

Figure 2C:
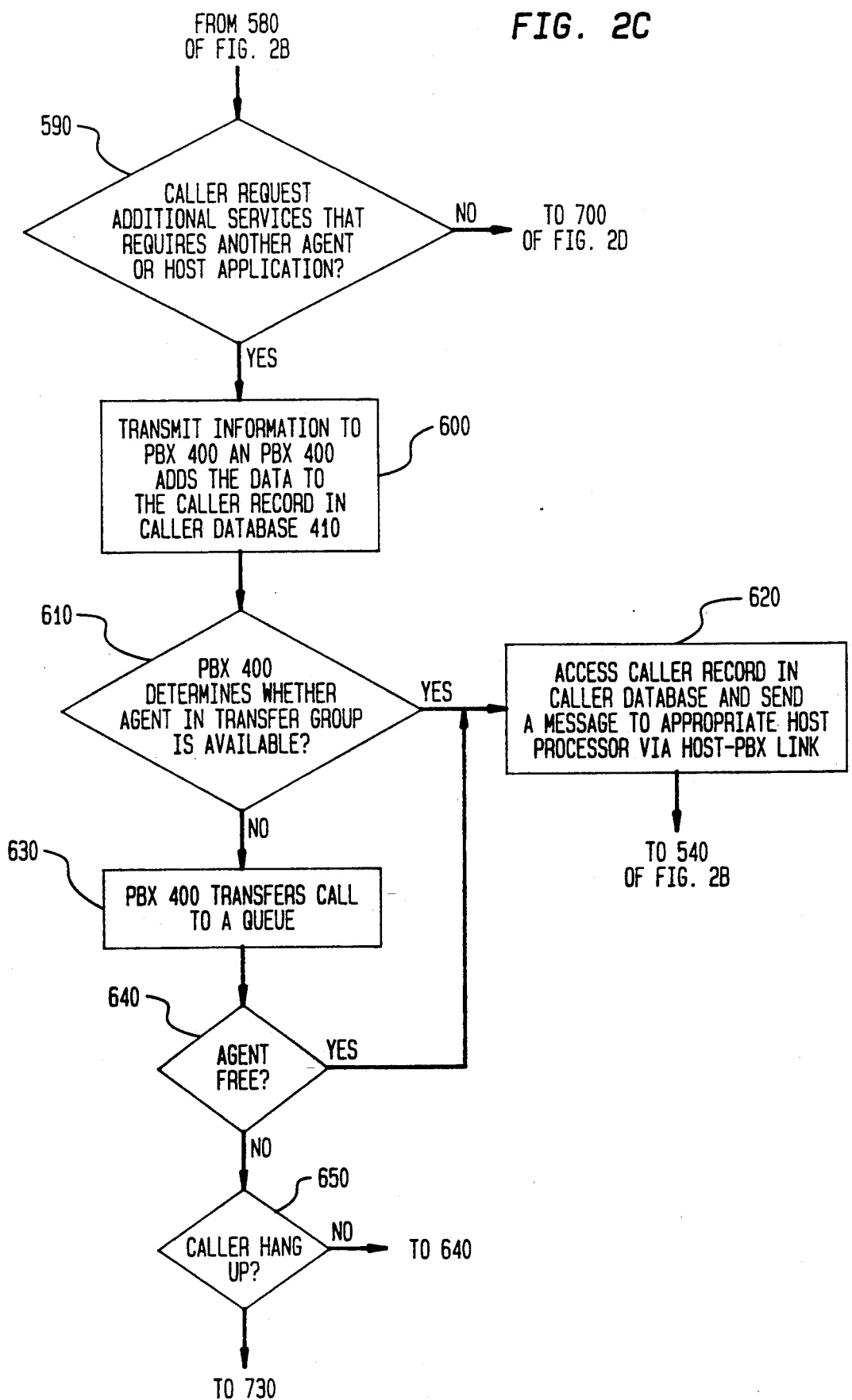

At decision block 590 of FIG. 2C, the HCCA program determines whether the caller requested additional services that requires another agent or host application, this being indicated by agent input to the display terminal. If so, control is transferred to block 600 of FIG. 2C, otherwise, control is transferred to block 700 of FIG. 2D.

At block 600 of FIG. 2C, the HCCA program obtains a predetermined set of information relating to the caller and the present telephone call and, optionally, transmits it in a WRITE message to PBX 400. In response, PBX 400 adds the information to the caller record in caller database 410. Then, control is transferred to decision block 610 of FIG. 2C.

At decision block 610 of FIG. 2C, PBX 400 performs a test to determine whether an agent is available in the group to which the call is being transferred. If an agent is not available, control is transferred to block 630 of FIG. 2C, otherwise, control is transferred to block 620 of FIG. 2C.

At block 620 of FIG. 2C, the applications program in PBX 400 accesses the caller record in caller database 410 and sends a call event transaction message to the appropriate host applications processor. Also, a call event transaction is sent to the previous host applications processor to inform it that the previous extension is free. Then, control is transferred to block 540 of FIG. 2B.

At block 630 of FIG. 2C, the call is transferred to a queue and the caller, for example, listens to music on hold until the agent is available. Then, control is transferred to decision block 640 of FIG. 2C.

At decision block 640 of FIG. 2C, the applications program in PBX 400 periodically performs a test to determine whether the called agent is available. If the agent becomes available, control is transferred to block 620 of FIG. 2C, otherwise, control is transferred to decision block 650 of FIG. 2D.

Figure 2D:
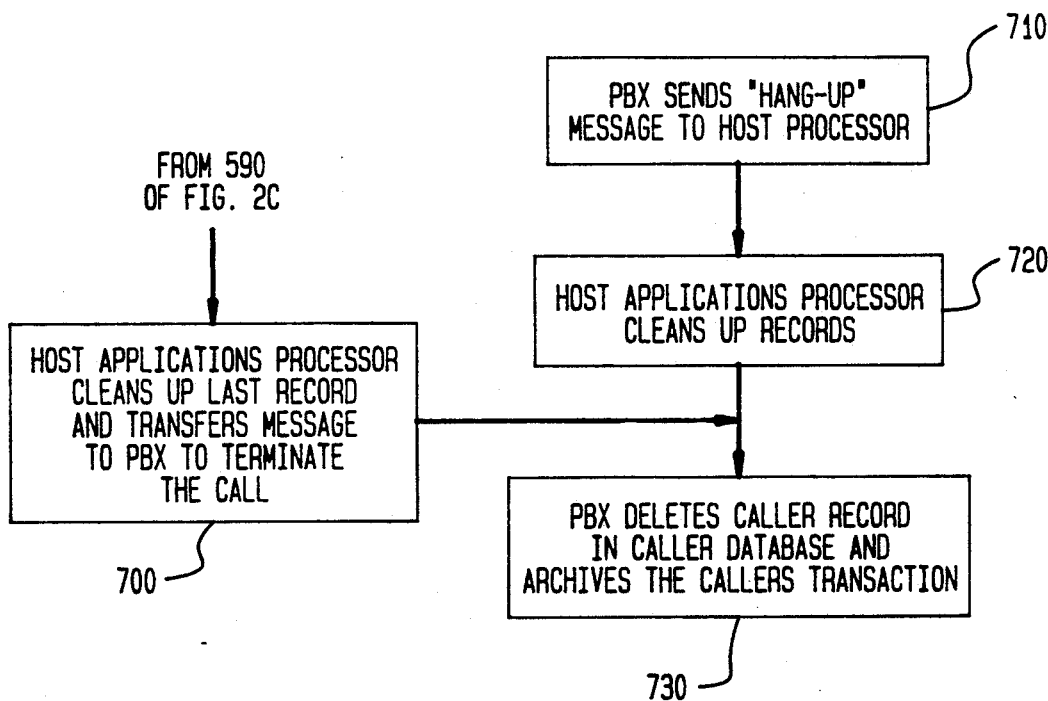

At decision block 650 of FIG. 2D, a test is performed to determine whether the caller has hung up. If the caller has not hung up, then control is transferred to block 640 of FIG. 2C to continue the hold pattern, otherwise, control is transferred to block 730 of FIG. 2D where PBX 400 cleans up caller database 410.

At block 700 of FIG. 2D, the caller does not need additional assistance and hangs up the telephone and, in response, the HCCA program cleans up the last record of the call and stores any desired user data relating to the call. Then, the HCCA program sends a message to PBX 400 to terminate the call. Lastly, control is transferred to block 730 of FIG. 2D.

At block 710 of FIG. 2D, if at any time, the caller hangs up the phone, the applications program in PBX 400 notifies the host applications processor that is presently interfacing with the caller that the call is completed by sending a CALL DISCONNECT transaction to the host applications processor. Then, control is transferred to block 720 of FIG. 2D.

At block 720 of FIG. 2D, the HCCA program cleans up the host record of the call and stores any desired user data relating to the call. Then, control is transferred to block 730 of FIG. 2D.

At block 730 of FIG. 2D, PBX 400 deletes the caller record in caller database 410 and archives the caller transaction in a manner which is similar to call detail record techniques which are well known to those of ordinary skill in the art as being used throughout the industry.

Those skilled in the art recognize that further embodiments of the present invention may be made without departing from its teachings.

What is claimed is:

1. Method for coordinating the transfer of a telephone call and information associated with the telephone call in a telephony environment comprised of (a) at least two telephones which interface with a switch and (b) at least tow display apparatus, one of the at least two display apparatus interfaces with one of at least two applications processor systems which are interfaced to the switch and another of the at least two display apparatus interfaces with another of the at least two applications processor systems which are interfaced to the switch, wherein one of the at least two telephones is associated with a called party who also uses one of the at least two display apparatus and another one of the at least two telephones is associated with a called party who also uses another one of the at least two display apparatus, the method comprising the steps of:

adding a record to a database associated with the switch in response to a telephone call from a calling party to a called party, which record comprises information pertaining to the calling party;

transmitting at least some of the information to an applications processor system which interfaces with the switch and which interfaces with a display apparatus used by the called party;

transmitting information form the applications processor system to the switch and storing at least a portion of the information in the record;

retrieving at least some portion of the information from the record in response to a request to transfer the calling party to another called party whose telephone is connected to the switch and which uses a display apparatus which interfaces with another applications processor system which also interfaces with the switch; and transferring the retrieval information to the another applications processor system which interfaces with the display apparatus used by the another called party.

2. The method of claim 1 wherein the method further comprises the steps of:

transmitting information from the another applications processor system to the switch; and storing at least a portion of the information in the record.

3. The method of claim 1 wherein the method further comprises the steps of:

retrieving at least some information from the record of response to a request from at least one of the applications processor systems; and transferring the at least some information to the at least one of the applications processor systems.

4. The method of claim 1 which further comprises the step of:

deleting the record from the database when the call is terminated.

5. The method of claim 1 wherein the information and the retrieved information comprises identification information relating to the calling party and the called party.

6. The method of claim 1 wherein the called party utilizes a telephone which comprises a display and wherein the step of transmitting at least some of the information further comprises transmitting at least some portion of the information to the display.

7. The method of claim 1 wherein the another called party utilizes a telephone which comprises a display and the step of transferring further comprises transmitting at least some portion of the information in the record to the display.

8. Apparatus for coordinating the transfer of a telephone call and information associated with the telephone call in a telephony environment comprised of (a) at least two telephones which interface with a switch and (b) at least two display apparatus, one of the at least two display apparatus interfaces with one of at least two applications processor systems which are interfaced to the switch and another of the at least two display apparatus interfaces with another of the at least two applications processor systems which are interfaced to the switch, wherein one of the at least two telephones telephone is associated with a called party who also uses one of the at least two display apparatus and another one of the at least two telephones is associated with a called party who also uses another one of the at least two display apparatus, the apparatus comprising:

means for adding a record to a database associated with the switch in response to a telephone call from a calling party to a called party, which record comprises information pertaining to the calling party;

means for transmitting at least some of the information to an applications processor system which interfaces with the switch and which interfaces with a display apparatus used by the called party;

means for transmitting information from the applications processor system to the switch and means for storing at least a portion of the information in the record;

means for retrieving at least some portion of the information from the record in response to a request to transfer the calling party to another called party whose telephone is connected to the switch and which uses a display apparatus which interfaces with another applications processor which also interfaces with the switch; and means for transferring the retrieved information to the another applications processor system which interfaces with the display apparatus used by the another called party.

9. The apparatus of claim 8 wherein the apparatus further comprises:

means for transmitting information from the another applications processor system to the switch; and means for storing at least a portion of the information in the record.

10. The apparatus of claim 8 which further comprises:

means for retrieving at least some information from the record in response to a request from at least one of the applications processor system; and means for transferring the at least some information to the at least one of the applications processor systems.

11. The apparatus of claim 8 which further comprises:

means for deleting the record from the database when the call is terminated.

12. The apparatus of claim 8 wherein the information and the retrieved information comprises identification information relating to the calling party and the called party.

13. The apparatus of claim 8 wherein the called party utilizes a telephone which comprises a display and wherein the means for transmitting at least some of the information further comprises means for transmitting at least some portion of the information to the display.

14. The apparatus of claim 13 wherein the another called party utilizes a telephone which comprises a display and the means for transferring further comprises means for transmitting at least some portion of the information in the record of the display.

* * * * *